3,235,626
POLYMERS OF CONTROLLED BRANCH CONFIGURATION
Richard Waack, Framingham, Mass., assignor to The Dow Chemical Company, Midland, Mich., a corporation of Delaware
No Drawing. Filed Mar. 31, 1961, Ser. No. 122,046
4 Claims. (Cl. 260—881)

This invention relates to the preparation of a long chain polymer containing a reactive double bond at a known position and, more specifically, to a method of initiating and carrying out polymerization by using a vinyl derivative of an active metal, and then form a branched copolymer or branched homopolymer by subsequent polymerization reaction.

In ordinary radical polymerizations any termination by disproportionation reaction will produce a polymer containing a terminal olefin group accompanied by a corresponding saturated moiety. Thus, such disproportionation mechanism in a given reaction mixture cannot give over 50% concentration of such a molecule, and, in most cases, the concentration will be much less. For example, the polymerization of methyl methacrylate is terminated mainly by disproportionation reaction. Therefore, up to 50% of the polymer molecules should contain a single vinyl group.

It is, accordingly, a fundamental object of this invention to provide a method of preparing essentially pure polymers containing a single reactive site, which polymers may be of relatively large molecular weight.

Other objects and advantages of this invention will in part be obvious and in part appear hereinafter.

The invention is embodied in the method of preparing a long chain polymer having a terminal reactive double bond. The said polymer having a formula $Vi(X)_n$—H corresponding essentially to the following representation:

$$HR_1C\!=\!CR_2(X)_n\!-\!H$$

wherein X represents a linear polymer backbone which may be homopolymer or copolymer, made up of many monomeric units and $R_1$ and $R_2$ represent hydrogen, chlorine, aryl, alkyl or vinyl moieties, which can be substituted on the indicated carbon atom. The compound thus formed is characteristically of a relatively large molecular weight, having a reactive terminal vinyl group, which is ready for reaction with other high molecular weight compounds also carrying terminal vinyl groups or a low molecular weight monomer, so that, by this polymerization through the active terminal vinyl groups an end product of very substantial molecular weight and variable compositions and branched structure can be obtained. In particular the structure of the compound makes it useful for forming polymers or copolymers which have a characteristic branched configuration. Accordingly, by following the process of this invention it is possible to form a linear polymeric backbone having a terminal vinyl group, $n$ being the indicated degree of polymerization and having a range of values from 2–500,000. The process for so doing is based upon the utilization of an active alkali metal vinyl compound to initiate polymerization, which, once initiated, takes place as an anionic reaction.

Any vinyl monomer or mixture of monomers, in any proportions, such as styrene, acrylonitrile, isoprene, butadiene, methacrylonitrile, acrylates and methacrylates, will form the polymer backbone when reacted with the activating metal vinyl compound according to the following scheme:

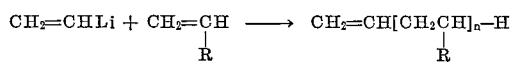

wherein R is an organic group that causes the vinyl monomer to be styrene, acrylonitrile, isoprene, butadiene, methacrylonitrile, acrylates and methacrylates as aforesaid, and $n$ represents the number of monomer units in the molecule.

The general representation of the activating vinyl compound ViM is as follows:

$$R_1HC\!=\!CR_2(CR_3R_4)_xM$$

In this schematic indication of the active metal vinyl compound M is any active metal such as lithium, sodium, potassium, cesium, and $R_1$–$R_4$ represent any organic substituent on the fundamental vinyl compound being used; in this representation $x$ may have a value of 0, 1, 2, or 3 so that, accordingly, the vinyl metal compound may be vinyl lithium, vinyl sodium, vinyl potassium, and substituted vinyl and aryl variants thereof; allyl lithium, allyl sodium, allyl potassium, and substituted allyl and aryl variants thereof.

The generalization does not indicate full substitution of the carbon atoms connected by the double bond although it would be possible. Full substitution could produce enough steric hindrance to reduce the activity of the vinyl compound to an uneconomic level.

The vinyl derivative of an active metal initiator may be prepared by the reaction of a vinyl substituted metal, such as tetravinyl tin and an organo metallic compound—e.g., alkyl or aryl derivative of an alkali metal such as butyllithium. Actually any vinyl lithium will do, for the method of preparation of the specific initiator is not critical to the process.

The mechanism of the reaction involved in this process may be better understood by reference to the following wherein it is illustrated in terms of vinyl lithium and styrene; for example, in a molar ratio of 1 mol of vinyl lithium per 100 mols of styrene the equation for the reaction may be written as follows wherein each molecule of the vinyl lithium initiates polymerization of styrene:

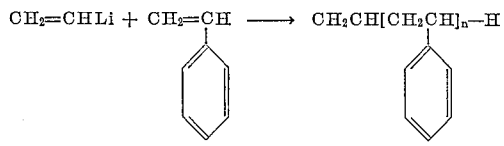

and the end product is a polymer having the composition indicated. Ideally, the composition will be a styrene molecule consisting of 100 monomer units joined together and carrying the initiating terminal vinyl group.

In other words the vinyl lithium initiates an ionic polymerization and each styrene monomer which is added to the chain forms a new anion on the end to keep the polymerization going to the point of the exhaustion of the system of styrene.

Thus the new polymer may be indicated generally to be a vinyl group attached to the polymer group or, stated differently, becomes a polymer terminating with a vinyl group. The usefulness of this termination with a functional group will become readily apparent because, for example, assuming a structure in which the monomer or polymer portion of the molecule consists of a thousand monomers terminating with a single vinyl group, this vinyl group can participate in other reactions. It thereby becomes a reaction site for further polymerization. In fact, the polymers consisting of the thousand monomeric units terminated thus, can react through this vinyl group thereby to form exceptionally high molecular weight branched polymers.

A more detailed understanding of the structure of the polymeric vinyl monomer, the properties and the method of preparation can be had by reference to the following examples:

Example 1.—Preparation of vinylpolystyrenes

The vinyl lithium was prepared from tetravinyl tin and butyllithium in hexane-pentane solution. For example, 0.82 gram of tetravinyl tin and 4.6 milliliters of butyllithium solution (1.63 N) were mixed on a sintered glass funnel under conditions designed to rigorously exclude air and moisture and protected by a nitrogen atmosphere. One hour was allowed for the reaction, after which nitrogen pressure was applied to the top of the funnel, thus forcing the liquid through, leaving the insoluble vinyllithium on the porous filter plate. The solid vinyllithium was washed twice with pure n-hexane, dissolved in 30 milliliters of dry ether, and filtered into a dry flask. This procedure gave pure vinyllithium separated from any tin containing residues or inorganic salts.

Rigorously dried and distilled styrene monomer (10 milliliters) was added slowly over a period of five minutes to the thermostated vinyllithium solution. The solution became yellow and viscous. At 15° C. polymerization is quantitative in 3 hours. The vinylpolystyrene is recovered by the usual procedure of precipitating in methanol followed by filtration and drying.

The final molecular weight of the polymer as measured by solution viscosity was 11,500.

Example 2

The preparation of the vinyllithium was the same as in the previous example. After washing the solid vinyllithium with n-hexane, it was dissolved in 30 milliliters of rigorously dried and distilled tetrahydrofuran and filtered into a clean dry flask. As before, 10 milliliters of rigorously dried-distilled styrene monomer was added to the thermostated initiator solution. After a brief interval the solution experienced copious heat evolution while assuming a deep orange color. The polymerization was quantitative in 2 to 3 minutes. The polymer was purified as in the previous example.

Example 3

In this example, the polymerization was carried out in the presence of the tin residues. In a nitrogen atmosphere 3.27 grams of tetravinyl tin were reacted with 14 milliliters of butyllithium solution (i.e., 2 moles of butyllithium per mole of tetravinyl tin) in 20 milliliters of dry diethyl ether for one hour at room temperature. The main reaction product besides vinyllithium was divinyldibutyl tin. This initiator solution was thermostated at 20° C. and 10 milliliters of pure dry styrene were added. The reaction was followed for a period of 2½ hours at which time it was terminated by the addition of water. The ash content of the polymer increased as the time of polymerization—that is, a sample taken at 1 hour has an ash of 2.8% whereas the sample taken at 2½ hours has an ach of 8.5%. The ash was shown to be chemically combined with the polymer since reprecipitation of the polymer did not alter the ash content. Thus, the divinyldibutyl tin copolymerized with the polymerizing styrene, the extent of copolymerization increased as the concentration of styrene decreased at the end of the polymerization. The molecular weight of the final polymer was 2400 as determined by solution viscosity.

In preparing polymers in accordance with this invention, temperatures are preferably kept in the range from about −78° C. to levels above room temperature, i.e., about 45° C. Of course, the temperature will depend somewhat on the chemical system being used and the activity of the compounds. Also, the higher temperatures not only favor faster reactions but also favor side reactions with solvent.

Time may be instantaneous to several hours to give complete polymerization, again depending on the system to be used.

Although pressure is not necessary, it is necessary to exclude air and water very carefully. Pressure would be used only to confine a volatile reactant or solvent.

A broad range of ratio of reactants is useful in the preparation of the products, because it is the ratio of the monomer entering into the formation of the polymer to the proportion of initiator and the concentration of initiator and reactant which controls the molecular weight of the final polymer. For example, the higher the ratio of initiator to monomer the lower will be the molecular weight of the polymer. If a half mole of initiator is used per mole of monomer, the molecular weight of the polymer will be twice the molecular weight of the monomer, plus that of the initiator. The molecular weight of the polymer will be given by the following general formula:

$$\frac{\text{No. mols of monomer}}{\text{No. mols of initiator}} (\text{Mol. weight of monomer}) + \text{Mol. weight of initiator}$$

This is a generalized statement of the fact that the initiator induces a homogeneous polymerization of the monomer and, with an equal distribution of monomeric units, the end product is the homopolymer terminated with an initiator moiety. In general it is useful to apply this principle in a variety of ways; for example, to utilize it for the preparation of prepolymers of a given molecular weight, e.g., 5–10 times that of the monomeric units, and then to induce polymerization of the prepolymer through the terminal or remaining active vinyl group contributed by the initiator. Thus virtually any ratio of starting monomer to initiator is useful and the reaction is a generalized one useful for the purpose of preparing polymers of extremely high molecular weight by using prepolymers of substantial molecular weight reacted with each other through the residual vinyl group contributed by the initiator in accordance with this process.

The preparation of branched polymers is illustrated in the following examples, in which a polymeric chain made up of vinyl monomer is copolymerized with a second monomer of defined length and composition, or the backbone chain of a linear vinyl polymer, corresponding to that described. This aspect of the process is embodied in the preparation of copolymers of two or more monomeric units, wherein an intermediate polymer structure is prepared, characterized by the fact that it has a linear polymeric backbone with a terminal vinyl group, whereupon it is reacted as the intermediate polymer with a vinyl monomer in the presence of an inert solvent and catalyst and, thereafter, a copolymer is recovered consisting of a linear polymer backbone with polymeric side-chains of known molecular composition and weight at regular or random sites.

Vinyl monomers which have a sufficiently reactive double bond such as ethyl methacrylate, acrylonitrile, methacrylonitrile, methyl methacrylate, acrylic acid, etc. are preferred. The intermediate vinyl polymers to be copolymerized with the vinyl monomer are prepared in accordance with the preceding examples by reacting a vinyl monomer or mixture of monomers, in any proportion, such as styrene, acrylonitrile, isoprene, butadiene, methacrylonitrile, acrylates, and methacrylates, with a vinyl derivative of an active metal, such as vinyl lithium, vinyl sodium, vinyl potassium, and substituted vinyl and aryl counterparts thereof, etc., i.e., monoolefinic compounds. The formation of the intermediate polymer may be summarized as follows:

(I)
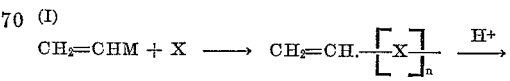

(Ia)

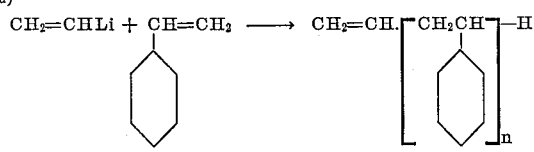

wherein M is an active metal and X represents a vinyl monomer.

Thereafter the formation of a branched polymeric product in accordance with this invention may be summarized as follows:

(II)

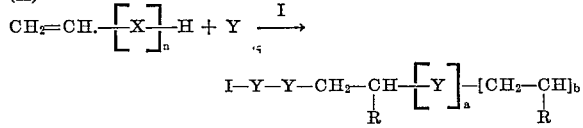

(IIa)

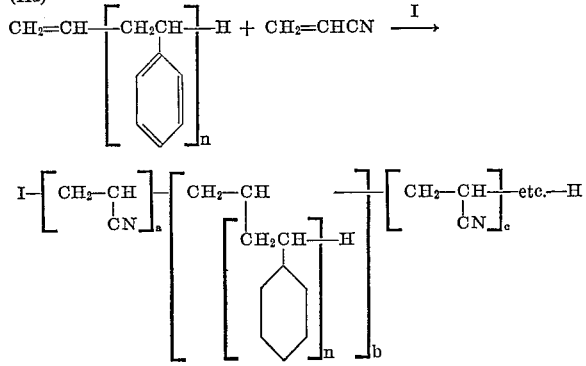

wherein I is the initiator of polymerization.

A more detailed understanding can be had by reference to the following examples:

*Example 4*

The formation of a copolymer between acrylontrile and vinylpolystyrene. A vinylpolystyrene of molecular weight 5000 (0.5 gram) prepared in accordance with the previous examples was dissolved in 11 milliliters of pure benzene in a Pyrex reaction tube. To this solution 3.5 milligrams of azo-bis-isobutyronitrile and 2.5 milliliters of distilled dry acrylonitrile monomer were added. The tube was evacuated by the usual freeze-thaw technique and sealed off under vacuum. The sealed tube was thermostated at 55° C. for 12 hours. The overall yield of co-polymer was 70%. The analysis of the co-polymer was that of a combination of acrylonitrile and polystyrene.

The polymer was extracted with benzene, which is a solvent for polystyrene and a non-solvent for polyacrylonitrile. The first extraction yield 17% benzene soluble material, the infrared spectrograph of which showed characteristics of both polystyrene, and polyacrylonitrile. A second extraction of the same polymer yields 9.1% benzene soluble material, the infrared of which is very similar to the first extraction. The conclusion here is that the benzene soluble material is rich in polystyrene, that is, polystyrene is the dominant constituent of this material and so the polystyrene portion determines its solubility characteristics. The benzene insoluble material is richer in polyacrylonitrile and so it exhibits the solubility characteristics of polyacrylonitrile, although its infrared spectrum shows absorption characteristics of polystyrene.

*Example 5*

Copolymerization of methyl methacrylate and vinylpolystyrene. In this experiment 0.45 gram of vinylpolystyrene of molecular weight 2400 was dissolved in 10 milliliters of benzene, to which was added 3.5 milligrams of azo-bis-isobutyronitrile and 2.5 milliliters of pure distilled methyl methacrylate monomer. The tube containing this reaction solution was evacuated and degassed by a freeze-thaw technique and sealed under vacuum. The sealed tube was thermostated at 55° C. for 12 hours.

The final reaction solution is extremely viscous. The starting vinyl polystyrene precipitated readily in methanol to give a flocculant precipitate. The reaction solution, on putting into methanol, gives only clouding indicating that none of the initial vinyl polystyrene remains in the "free" state. The co-polymer was isolated by freeze-drying from benzene. The yield was 1.7 grams of tough, rubbery white polymer having an infrared spectrum characteristic of both polystyrene and polymethyl methacrylate. Cyclohexane is a solvent for polystyrene, but not for the polymethyl methacrylate. Extraction with cyclohexane was used to prove the absence of pure polystyrene. The cyclohexane soluble material shows both polystyrene and polymethyl methacrylate infrared absorption similar to the "whole" co-polymer.

In carrying out the process, the conditions should be the same as any ordinary vinyl polymerization, e.g., temperture is not an important factor except in rate of reaction, since, for example, a very low temperature will result in a very slow reaction. Time and pressure have no unusual significance. Any solvent sufficiently inert to free radical attack or participation of cation or anionic polymerization is employed.

The initiator of the graft polymerization may be free radical or other initiators of vinyl polymerization of cationic or anionic nature. Since the relative reactivities of the two species will change depending on the initiator, the ratios of the two components in the copolymer will be changed depending on the initiator.

The highly-branched nature of the polymer formed by the graft process will have a melt viscosity much lower than a linear polymer of the same molecular weight, and has advantages in extrusion, injection molding and similar fabrication methods. Also certain copolymers formed, namely, copolymer of a polymeric vinyl monomer and acrylic acid, has groups of hydrophylic and hydrophobic character in the molecule making them useful as a "polysoap."

The solvent used in carrying out the reaction in the preparation of prepolymers as well as the finished group of polymers will control the overall rate of polymerization as indicated in the several specific examples given in this specification. In general a very slow rate of polymerization will be realized in media which are poor solvents for the metal-carbon dipole and faster rates will be observed in ethers which solvate an ion pair quite well. Ethers having strong electron donating power enhance the rate of polymerization.

What is claimed is:

1. The method of forming a polymer of controlled branch configuration which comprises forming a prepolymer by reacting a vinyl metal compound having the formula ViM selected from the group consisting of vinyl lithium, vinyl sodium, vinyl potassium, lower alkyl substituted vinyl and phenyl counterparts thereof, allyl lithium, allyl sodium, and allyl potassium, with a monoolefinic monomer and a polymerization catalyst, thereby to form a polymer corresponding to the following:

$$Vi(X)_n-H$$ 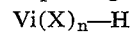

wherein Vi represents the vinyl moiety of said vinyl metal, X represents a linear polymeric backbone from said olefinic monomer and $n$ represents an integer of value 2 to 500,000 and is the degree of polymerization, wherein the vinyl group of the initiator compound retains its identity as an active group in the polymer thus formed, recovering said polymer whereby said polymerization catalyst is removed, dissolving said polymer in a solvent, adding a polymerization catalyst and reacting with a material selected from the group consisting of a different polymer having a reactive vinyl group therein, and a different vinyl monomer, thereby to engraft said first polymer onto said second polymer to form a branched structure.

2. A method of forming a polymer of controlled branch configuration which comprises a vinyl polystyrene prepolymer by adding a styrene monomer to a vinyl lithium solution, recovering the vinyl polystyrene polymer, thereafter, dissolving said vinyl polystyrene in a solvent, adding a catalyst and a monomer selected from the group consisting of acrylonitrile and methyl methacrylate, maintaining the reaction mixture at a temperature of about 55° C. for a period of time to complete polymerization and recovering the polymeric product formed.

3. A method of forming a polymer of controlled branch configuration which comprises forming a vinyl polystyrene prepolymer by adding a styrene monomer to a vinyl lithium solution, recovering the vinyl polystyrene polymer, thereafter dissolving said vinyl polystyrene in a solvent, adding a catalyst and dry acrylonitrile, maintaining the reaction mixture at a temperature of about 55° C. for a period of time to complete polymerization and recovering the polymeric product formed.

4. A method of forming a polymer of controlled branch configuration which comprises a vinyl polystyrene prepolymer by adding a styrene monomer to a vinyl lithium solution, recovering the vinyl polystyrene polymer, thereafter, dissolving said vinyl polystyrene in a solvent, adding a catalyst and methyl methacrylate, maintaining the reaction mixture at a temperature of about 55° C. for a period of time to complete polymerization and recovering the polymeric product formed.

References Cited by the Examiner
UNITED STATES PATENTS

| | | | |
|---|---|---|---|
| 2,841,567 | 7/1958 | Blanton et al. | 260—29.6 |
| 2,881,156 | 4/1959 | Pilar et al. | 260—881 |
| 3,012,000 | 12/1961 | Aries | 260—881 |
| 3,029,221 | 4/1962 | Welch | 260—895 |
| 3,059,036 | 10/1962 | Honeycutt | 260—665 |

OTHER REFERENCES

Gaylord et al., Linear and Stereoregular Addition Polymers, Interscience Publishers, Inc., New York (1959), p. 247.

MURRAY TILLMAN, *Primary Examiner.*

LEON J. BERCOVITZ, *Examiner.*